United States Patent
Salonen

(10) Patent No.: US 11,004,015 B2
(45) Date of Patent: May 11, 2021

(54) AUTHENTICATION METHOD AND SYSTEM

(71) Applicant: BOOKIT OY AJANVARAUSPALVELU, Helsinki (FI)

(72) Inventor: Jukka Kalevi Salonen, Luhtajoki (FI)

(73) Assignee: Bookit OY

( * ) Notice: Subject to any disclaimer, the term of this patent is extended or adjusted under 35 U.S.C. 154(b) by 1333 days.

(21) Appl. No.: 14/551,678

(22) Filed: Nov. 24, 2014

(65) Prior Publication Data

US 2015/0081558 A1 Mar. 19, 2015

Related U.S. Application Data

(63) Continuation of application No. 13/897,785, filed on May 20, 2013, which is a continuation of application (Continued)

(30) Foreign Application Priority Data

Aug. 21, 2001 (FI) ..................................... 20011680

(51) Int. Cl.
*G06Q 20/32* (2012.01)
*G06Q 10/02* (2012.01)
(Continued)

(52) U.S. Cl.
CPC ........... *G06Q 10/02* (2013.01); *G06Q 10/025* (2013.01); *G06Q 10/109* (2013.01);
(Continued)

(58) Field of Classification Search
CPC .... G06Q 10/02; G06Q 30/0613; G06Q 20/14; G06Q 20/40; G06Q 30/06; H04W 12/06; H04W 12/00514
(Continued)

(56) References Cited

U.S. PATENT DOCUMENTS

| | | |
|---|---|---|
| 5,592,666 A | 1/1997 | Perez |
| 5,838,965 A | 11/1998 | Kavanagh et al. |

(Continued)

FOREIGN PATENT DOCUMENTS

| | | |
|---|---|---|
| CN | 1675637 A | 9/2005 |
| EP | 0881802 A1 | 2/1998 |

(Continued)

OTHER PUBLICATIONS

"Mobileway", Feb. 21, 2001, Cardflash.com, 3 pages, (Year: 2001).*

(Continued)

*Primary Examiner* — George Chen
*Assistant Examiner* — Freda A Nelson
(74) *Attorney, Agent, or Firm* — Barnes & Thornburg LLP

(57) ABSTRACT

Provide herein is a method and system capable of authenticating transactions involving at least one service provider and one or more users who are each in electronic communication. This electronic communication can be, for example, SMS, MMS, e-mail, or online account messaging. It is an aspect of certain embodiments where the transaction is an authentication and/or verification of an entity. Examples of such entities are products, actions and users.

40 Claims, 8 Drawing Sheets

Related U.S. Application Data

No. 12/972,610, filed on Dec. 20, 2010, now Pat. No. 9,177,268, which is a continuation of application No. 11/980,470, filed on Oct. 31, 2007, now Pat. No. 8,050,664, which is a continuation of application No. 10/227,194, filed on Aug. 21, 2002, now Pat. No. 7,406,429.

(51) Int. Cl.

| | | |
|---|---|---|
| *H04W 4/50* | (2018.01) | |
| *G06Q 10/10* | (2012.01) | |
| *G06Q 20/40* | (2012.01) | |
| *H04M 3/42* | (2006.01) | |
| *H04L 29/12* | (2006.01) | |
| *G06Q 30/06* | (2012.01) | |
| *H04W 4/12* | (2009.01) | |
| *H04W 12/06* | (2021.01) | |
| *H04L 29/08* | (2006.01) | |
| *H04L 29/06* | (2006.01) | |
| *G06Q 30/02* | (2012.01) | |
| *H04W 4/14* | (2009.01) | |
| *G06Q 50/14* | (2012.01) | |
| *H04L 12/58* | (2006.01) | |
| *H04W 4/40* | (2018.01) | |
| *G08G 1/00* | (2006.01) | |
| *H04W 12/00* | (2021.01) | |

(52) U.S. Cl.
CPC ........ *G06Q 10/1095* (2013.01); *G06Q 20/322* (2013.01); *G06Q 20/3221* (2013.01); *G06Q 20/3255* (2013.01); *G06Q 20/40* (2013.01); *G06Q 20/4014* (2013.01); *G06Q 30/0267* (2013.01); *G06Q 30/0601* (2013.01); *G06Q 30/0609* (2013.01); *G06Q 30/0623* (2013.01); *G06Q 50/14* (2013.01); *H04L 29/12726* (2013.01); *H04L 51/18* (2013.01); *H04L 51/30* (2013.01); *H04L 67/10* (2013.01); *H04L 67/42* (2013.01); *H04M 3/42382* (2013.01); *H04W 4/12* (2013.01); *H04W 4/14* (2013.01); *H04W 4/40* (2018.02); *H04W 4/50* (2018.02); *H04W 12/06* (2013.01); *G08G 1/207* (2013.01); *H04W 12/00512* (2019.01); *H04W 12/00514* (2019.01)

(58) Field of Classification Search
USPC ....................................................... 705/5, 80
See application file for complete search history.

(56) References Cited

U.S. PATENT DOCUMENTS

| | | | |
|---|---|---|---|
| 5,940,818 A | 8/1999 | Malloy et al. | |
| 5,987,467 A | 11/1999 | Ross et al. | |
| 6,003,036 A | 12/1999 | Martin | |
| 6,085,100 A | 7/2000 | Teemu | |
| 6,104,870 A | 8/2000 | Frick et al. | |
| 6,199,076 B1 | 3/2001 | Logan et al. | |
| 6,236,968 B1 | 5/2001 | Kanevsky et al. | |
| 6,308,887 B1 * | 10/2001 | Korman ................ G06Q 20/18 235/379 | |
| 6,370,389 B1 * | 4/2002 | Isomursu .......... H04M 1/72552 455/466 | |
| 6,539,360 B1 | 3/2003 | Kadaba | |
| 6,560,456 B1 | 5/2003 | Lohtia et al. | |
| 6,564,261 B1 | 5/2003 | Gudjonsson et al. | |
| 6,625,461 B1 | 9/2003 | Bertacchi | |
| 6,639,919 B2 | 10/2003 | Kroninger et al. | |
| 6,704,789 B1 * | 3/2004 | Ala-Laurila ....... H04W 12/0602 709/230 | |
| 6,772,336 B1 | 8/2004 | Dixon, Jr. | |
| 6,873,688 B1 | 3/2005 | Aarnio | |
| 6,990,332 B2 | 1/2006 | Vihinen | |
| 7,149,537 B1 | 12/2006 | Kupsch et al. | |
| 7,154,060 B2 | 12/2006 | Rosenbaum et al. | |
| 7,222,081 B1 | 5/2007 | Sone | |
| 7,406,429 B2 | 7/2008 | Salonen | |
| 7,451,118 B2 | 11/2008 | McMeen et al. | |
| 7,610,208 B2 | 10/2009 | Salonen | |
| 7,610,224 B2 | 10/2009 | Spiegel | |
| 7,619,584 B2 | 11/2009 | Wolf | |
| 7,660,397 B2 | 2/2010 | Heen et al. | |
| 7,844,674 B2 | 11/2010 | Madams et al. | |
| 7,848,940 B1 * | 12/2010 | Harniman .......... G06Q 30/0222 705/5 | |
| 7,996,023 B2 | 8/2011 | McGary et al. | |
| 8,050,664 B2 | 11/2011 | Salonen | |
| 8,145,245 B2 | 3/2012 | Aulu | |
| 8,359,242 B2 | 1/2013 | Guillot | |
| 2001/0037264 A1 | 11/2001 | Husemann et al. | |
| 2001/0049785 A1 | 12/2001 | Kawan et al. | |
| 2002/0028686 A1 | 3/2002 | Kagi | |
| 2002/0032589 A1 | 3/2002 | Shah | |
| 2002/0032631 A1 * | 3/2002 | Rose ..................... G06Q 10/10 705/37 | |
| 2002/0059146 A1 | 5/2002 | Keech | |
| 2002/0080822 A1 | 6/2002 | Brown et al. | |
| 2002/0104007 A1 | 8/2002 | Moodie et al. | |
| 2002/0111914 A1 | 8/2002 | Terada et al. | |
| 2002/0128908 A1 | 9/2002 | Levin et al. | |
| 2002/0165000 A1 | 11/2002 | Fok | |
| 2002/0173319 A1 | 11/2002 | Fostick | |
| 2002/0180696 A1 | 12/2002 | Maritzen et al. | |
| 2002/0184509 A1 | 12/2002 | Scheidt et al. | |
| 2002/0188562 A1 | 12/2002 | Igarashi | |
| 2002/0191795 A1 | 12/2002 | Wills | |
| 2003/0005126 A1 | 1/2003 | Schwartz et al. | |
| 2003/0101071 A1 | 5/2003 | Salonen | |
| 2003/0163536 A1 | 8/2003 | Pettine, Jr. | |
| 2003/0211844 A1 | 11/2003 | Omori | |
| 2004/0097247 A1 | 5/2004 | Vilkuna et al. | |
| 2004/0128158 A1 | 7/2004 | Salonen | |
| 2004/0128173 A1 | 7/2004 | Salonen | |
| 2004/0139318 A1 | 7/2004 | Fiala et al. | |
| 2004/0157628 A1 | 8/2004 | Daniel et al. | |
| 2004/0185883 A1 | 9/2004 | Rukman | |
| 2004/0198322 A1 | 10/2004 | Mercer | |
| 2005/0027608 A1 | 2/2005 | Wiesmuller et al. | |
| 2005/0044042 A1 | 2/2005 | Mendiola et al. | |
| 2005/0054286 A1 | 3/2005 | Kanjilal | |
| 2005/0065995 A1 | 3/2005 | Millstein et al. | |
| 2005/0102230 A1 | 5/2005 | Haidar | |
| 2005/0171738 A1 | 8/2005 | Kadaba | |
| 2005/0246209 A1 | 11/2005 | Salonen | |
| 2005/0268107 A1 | 12/2005 | Harris et al. | |
| 2006/0010085 A1 | 1/2006 | McMeen et al. | |
| 2006/0040682 A1 | 2/2006 | Goertz et al. | |
| 2006/0075139 A1 | 4/2006 | Jungck | |
| 2006/0131385 A1 | 6/2006 | Kim | |
| 2006/0168064 A1 | 7/2006 | Huynh et al. | |
| 2006/0224407 A1 | 10/2006 | Mills | |
| 2006/0271551 A1 | 11/2006 | Suojasto | |
| 2007/0010266 A1 | 1/2007 | Chaudhuri | |
| 2007/0047533 A1 | 3/2007 | Criddle et al. | |
| 2007/0105536 A1 | 5/2007 | Tingo, Jr. | |
| 2007/0123246 A1 | 5/2007 | Daniel et al. | |
| 2007/0135101 A1 | 6/2007 | Ramati et al. | |
| 2007/0143230 A1 | 6/2007 | Narainsamy et al. | |
| 2007/0239578 A1 | 10/2007 | Klemens | |
| 2007/0288215 A1 | 12/2007 | Goldman | |
| 2008/0147408 A1 | 6/2008 | Da Palma | |
| 2008/0256191 A1 | 10/2008 | Murphy et al. | |
| 2008/0285475 A1 | 11/2008 | Menditto | |
| 2008/0317224 A1 | 12/2008 | Salonen | |
| 2009/0104925 A1 | 4/2009 | Aula | |
| 2009/0175422 A1 | 7/2009 | Marics et al. | |
| 2009/0264100 A1 | 10/2009 | Sapir et al. | |

(56) References Cited

U.S. PATENT DOCUMENTS

| | | |
|---|---|---|
| 2009/0281929 A1 | 11/2009 | Boitet et al. |
| 2010/0030689 A1 | 2/2010 | Ramos et al. |

FOREIGN PATENT DOCUMENTS

| | | | |
|---|---|---|---|
| EP | 0967754 A2 | 12/1999 | |
| EP | 1065899 A1 | 3/2001 | |
| EP | 1458201 A1 | 9/2004 | |
| EP | 1546938 A1 | 6/2005 | |
| FI | 20011680 A | 2/2003 | |
| FI | 000117663 B | 12/2006 | |
| FI | 20060387 A | 10/2007 | |
| FI | 000118586 B | 12/2007 | |
| FR | 2821225 A1 * | 8/2002 | ............. H04L 63/08 |
| GB | 2391646 A | 11/2004 | |
| GB | 2435565 A | 8/2007 | |
| KR | 20040013261 A | 2/2004 | |
| WO | 9706603 A2 | 2/1997 | |
| WO | 0041102 A2 | 7/2000 | |
| WO | 0052601 A1 | 9/2000 | |
| WO | 2001013299 A2 | 2/2001 | |
| WO | 0139033 A1 | 5/2001 | |
| WO | 0153991 A1 | 7/2001 | |
| WO | 2002067602 A1 | 8/2002 | |
| WO | 2004019223 A1 | 3/2004 | |
| WO | 2006122399 A1 | 11/2006 | |
| WO | 2007063179 A1 | 6/2007 | |
| WO | 2007122292 A1 | 11/2007 | |
| WO | 2007125171 A1 | 11/2007 | |
| WO | 2008017695 A2 | 2/2008 | |
| WO | 2010000949 A1 | 1/2010 | |

OTHER PUBLICATIONS

Bmd wireless AG; Wirelss Application Messaging Serivce; Unknown 2004.

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector-Product Information Document; Unknown 2001.

Finnair Plc's Press Release; Finnair to Introduce the World's Easiest Check-In with a Text Message; Jun. 9, 2004; www.bookit.net/news.

Finnish Search Report; May 4, 2006.

Finnish Search Report; Jun. 3, 2009.

Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.

Mobileway; Mobileway Launches its Mobile Transaction Tracker Solution—An Interactive Platform to Authenticate Macropayment Made by Mobile Consumers; Jul. 2002; pp. 1-2; United States.

Mouly et al.; The GSM System for Mobile Communications; Unknown 1992; pp. 556-560; Palaiseau.

Penttinen; GSM-tekniikka; WSOY; Unknown 1999; pp. 155-157, 222 and 331-332; Porvoo.

Verkkouutiset; Sonera Tarjoaa Matkaviestinoperaattoreille Content Gateway—Palvelualustaa; Feb. 21, 2001; www.verkkouutiset.fi.

\* cited by examiner

AUTHENTICATION METHOD AND SYSTEM

PRIORITY CLAIM

This patent application is a continuation of U.S. patent application Ser. No. 13/897,785, filed 20 May 2013, which is a continuation of U.S. patent application Ser. No. 12/972,610, filed 20 Dec. 2010, which is a continuation of U.S. patent application Ser. No. 11/980,470, filed 31 Oct. 2007, now U.S. Pat. No. 8,050,664, which is a continuation of U.S. patent application Ser. No. 10/227,194, filed 21 Aug. 2002, now U.S. Pat. No. 7,406,429, which claims priority to Finnish Patent Application No. 20011680, filed 21 Aug. 2001, the disclosures of which are incorporated herein by reference in their entirety.

FIELD OF THE INVENTION

The present invention relates to telecommunications. In particular, the invention relates to a method and system for authentication and/or verification via telecommunications.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

Additionally, such services as well as other services/companies such as banks and credit card companies have long had the problem of verifying that the user attempting to make a reservation, booking or purchase is the actual user that they claim to be. Similarly, customers would like to know that the information that they are providing to these services/companies is going to the actual company and that their information is secure. With identity fraud resulting from submitting personal information over the internet being a concern for many web users there exists the need for a safer authentication alternative than currently exists.

Companies and organizations, such as software developers and pharmaceutical companies, have for a long time dealt with the problem of piracy. Not only are such entities harmed by lost sales from counterfeit goods but consumers who unknowingly purchase counterfeit goods can be harmed by, for example, malware installed by hacked software or poor quality and mislabeled counterfeit drugs. Currently, such companies are trying to develop methods in which the authenticity of their products can be easily determined by their customers either prior to purchase or prior to use.

For services such as booking or calendar functions, information exchange often takes place as synchronizing booking or calendar entries. For that purpose, several important standardization efforts are going on. For example, SyncML is an industry initiative to develop and promote a single, common data synchronization protocol. vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

A common problem with all of these existing solutions is that they do not provide common semantics for different systems and the transfer of information may not always be as secure, or at least perceived as secure by customers, as many customers wish. Another problem is that booking systems have multiple different and usually quite complex user interfaces. If a customer wants to both make an appointment with a dentist and book a taxi to take him or her there, the customer needs to enter all the booking information to both booking systems in different ways. While the dentist may have in place a secure method of making reservations, authenticating the client who makes the reservation and receiving payment for a booking, the taxi company may not.

Additionally, it becomes challenging to manage client replies for instance when a client has been given a number of questions. For example, it makes sense to use SMS text messages to ask a client which option he or she chooses, because in many countries, like in Finland, it is very common to communicate with SMS text messages and they create revenues to operators. However, if a client replies to several inquires by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

Other problems, such as clients not showing up for appointments, not using a service more than once or long intervals between use of a service can be addressed through the use of new systems and methods.

SUMMARY OF THE INVENTION

The object of the invention is to provide a method and system capable of authenticating transactions involving at least one service provider and one or more users who are each communicating electronically.

It is an aspect of certain embodiments to provide a method and system capable of making booking type transactions between a plurality of service providers and a plurality of users who are each communicating with a mobile telephone capable of receiving and sending short text messages (e.g., SMS messages).

It is a further aspect of certain embodiments where the transaction is an authentication and/or verification of an entity. Examples of such entities are products, actions and users.

It is yet a further aspect of certain embodiments for the method and system to be used to augment a transaction for the benefit of the service provider. For instance, when a software developer releases a free trial version of a product to a plurality of users they often expect around 3% of those downloads to turn in to actual sales of the product. Through implementations of the embodiments of the present invention, the service provider can utilize SMS communication with the users who downloaded the trial to entice use and purchase of the paid program.

BRIEF DESCRIPTION OF THE DRAWINGS

In the following section, the invention will be described in detail by the aid of a few examples of its embodiments, in which.

DESCRIPTION OF THE INVENTION

Figure 1:
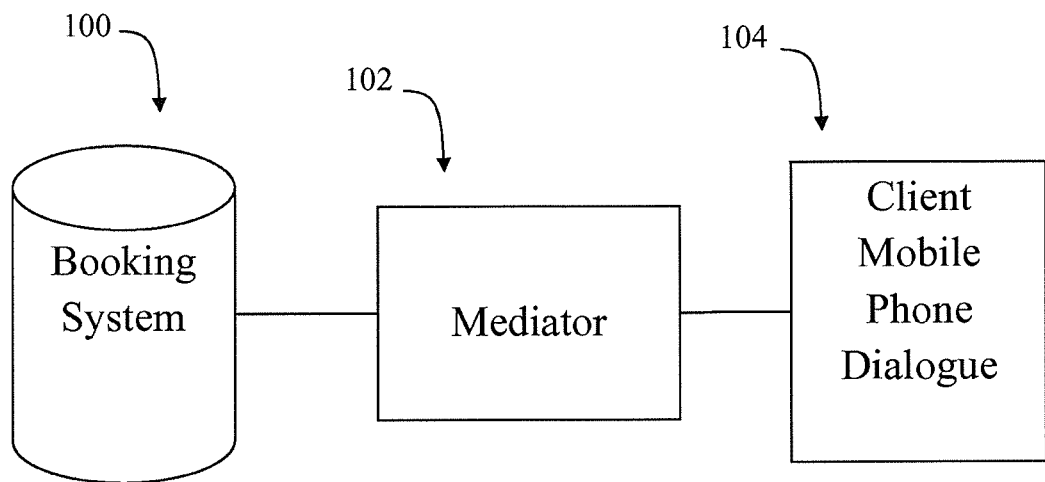
FIG. 1 represents one advantageous system in accordance with an embodiment of the invention.

Certain embodiments of the present invention relate to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

The booking system in accordance with embodiments of the present invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and a well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a clients need, for example coordination of an airline booking with transportation to the airport.

FIG. 1 is a diagram of the simplest system comprising a single service provider booking system 100 for a single service provider, a mediator 102 communicating with the service provider over a network, and a user with a mobile phone having a dialogue entered thereon.

Figure 2:
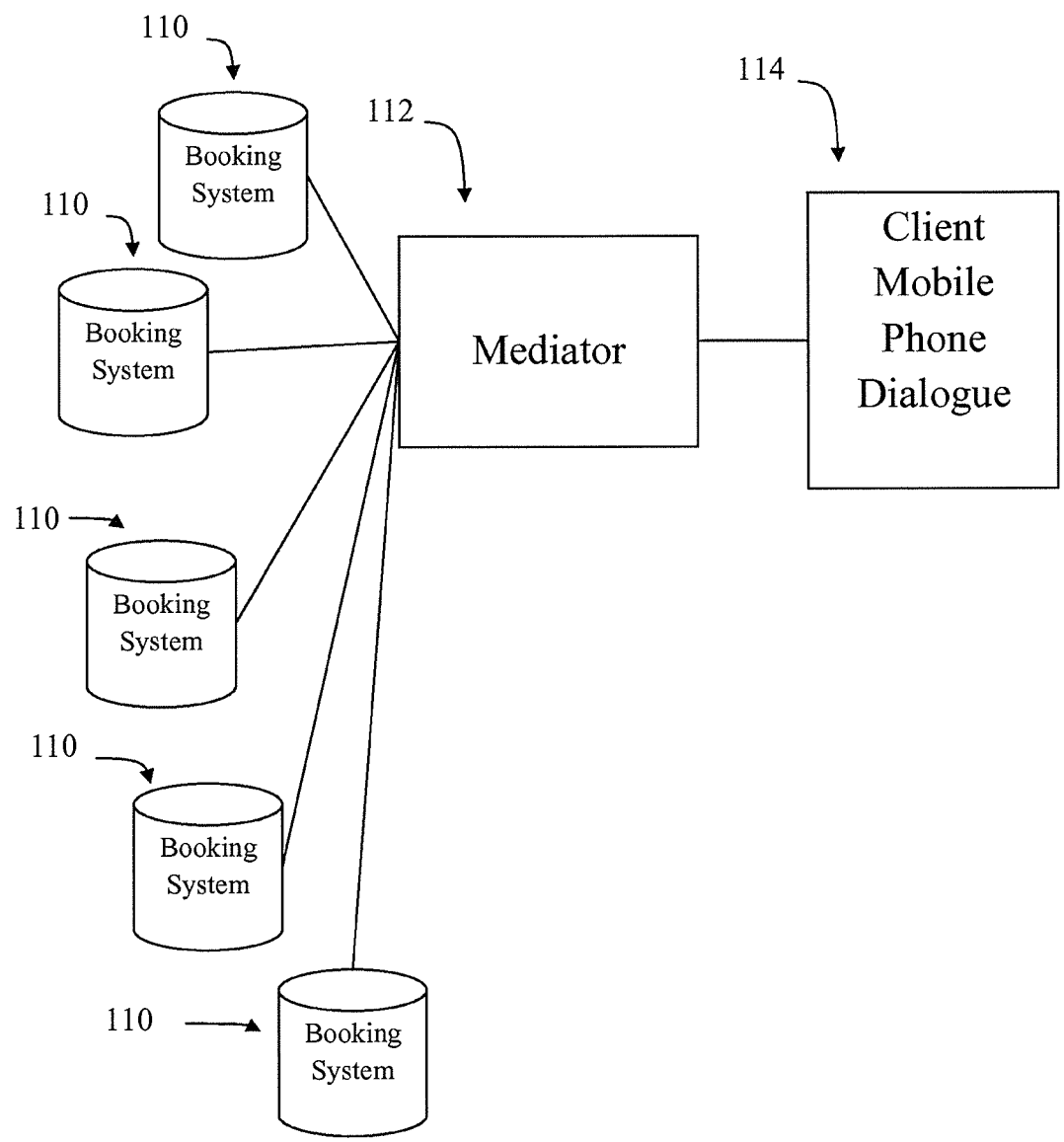
FIG. 2 represents a second advantageous system in accordance with an embodiment of the invention.

FIG. 2 shows a plurality of service provider booking systems communicating with a mediator over a network.

Figure 3:
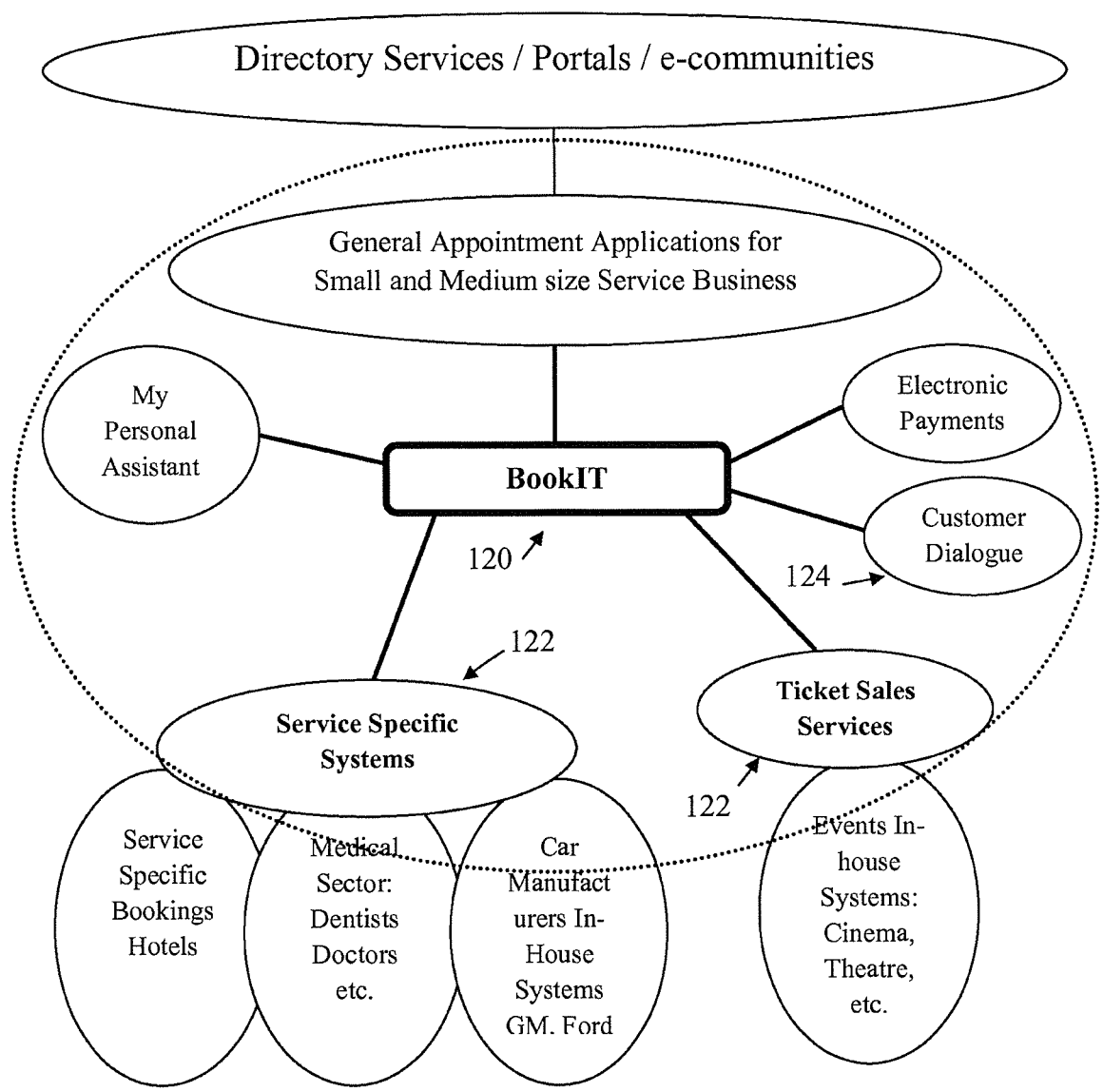
FIG. 3 represents a third advantageous system in accordance with an embodiment of the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:
1. There is a predetermined set of dialogues in the system. Their content and the possible choices are set in advance. For example, if a client books a flight, a dialogue always offers certain other bookings. Client's prior actions are not taken into consideration.
2. There is an unlimited number of dynamic or "intelligent" dialogues that are based on, for instance, a profile that a client has created himself or herself, usage history records, and client's location. Simple logic supports decisions. It is a low-level expert system.
3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
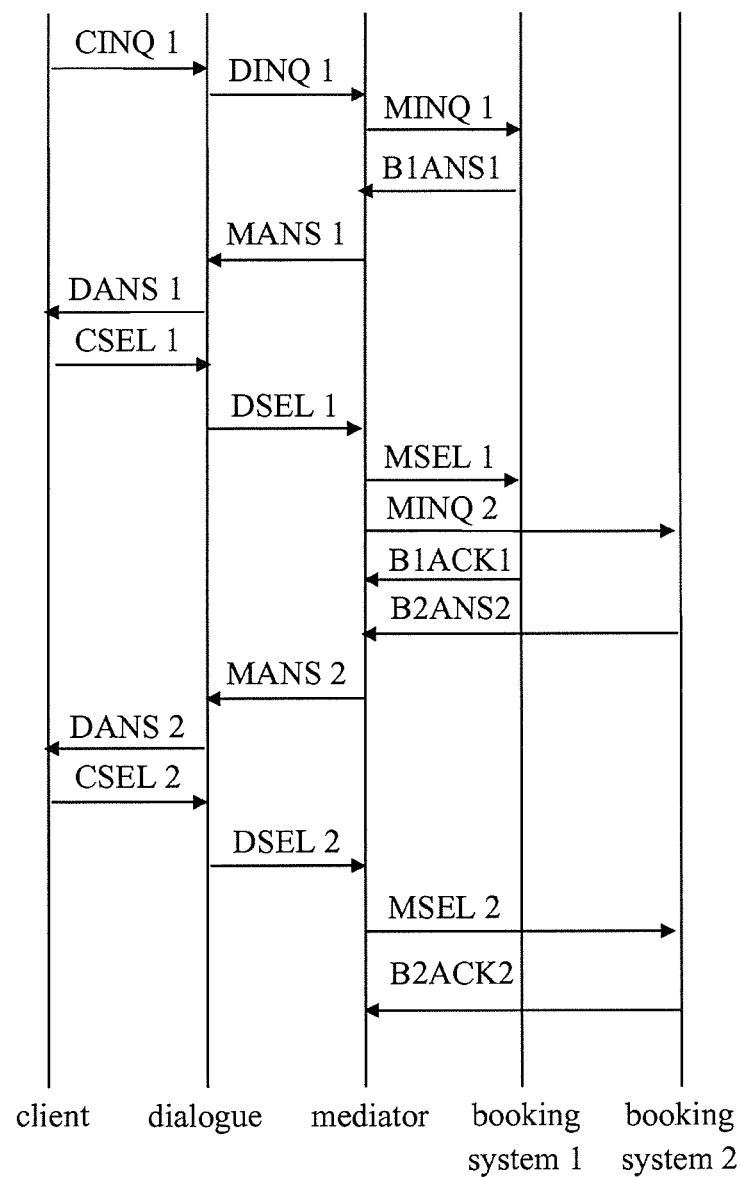
FIG. 4 is one advantageous example of a sequence diagram representing messages transmitted within a system in accordance with an embodiment of the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
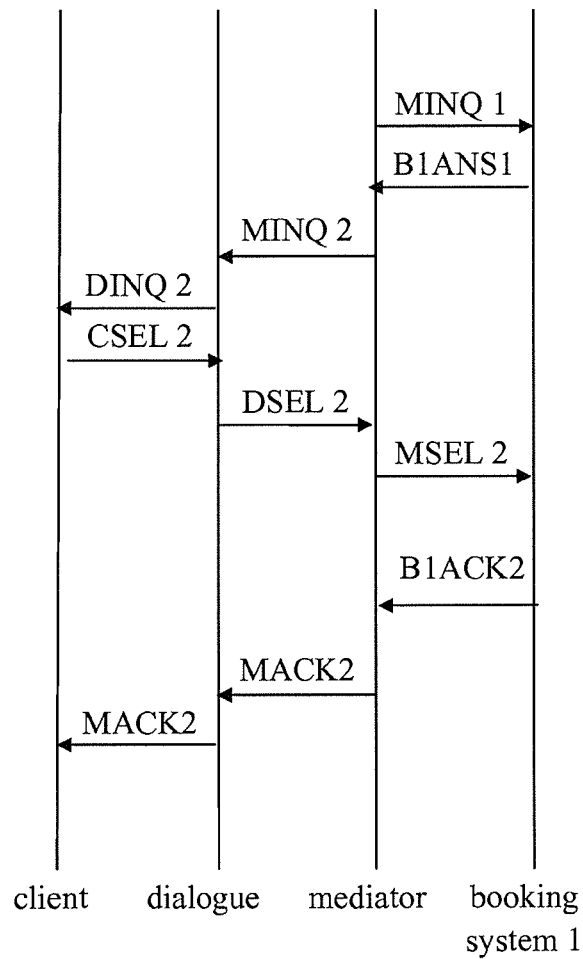
FIG. 5 is a second advantageous example of a sequence diagram representing messages transmitted within a system in accordance with an embodiment of the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQ1, was initiated by the mediator.

Example 1

A Preferred Booking System

A preferred booking system according to the invention is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a suggested start-time (ISO time-stamp w/time zone)
b suggested start-location (coordinates)
c suggested end-time (ISO time-stamp w/time zone)
d suggested end-location (coordinates)

4. Confirming

Time and location as it is accepted by the resources that have accepted. Data related to this phase:
a accepted start-time (ISO time-stamp w/time zone)
b accepted start-location (coordinates)
c accepted end-time (ISO time-stamp w/time zone)
d accepted end-location (coordinates)

By default the data is copied from the Planning phase.

In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a actual start-time (ISO time-stamp w/time zone)
b actual start-location (coordinates)
c actual end-time (ISO time-stamp w/time zone)
d actual end-location (coordinates)
e products used, extras, mileage, . . . .

By default the data is copied from the Confirming phase.

6. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| Phase/Data | Identifying | Resources | Suggested time | Accepted time | Task's work related | Accounting | Closing |
|---|---|---|---|---|---|---|---|
| Filing | X | | | | | X | |
| Requesting | X | X | | | | X | |
| Scheduling | X | X | X | | | X | |
| Confirming | X | X | X | X | | X | |
| Working | X | X | X | X | X | X | |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

d "SomeDeclines" (3) for "Some of the invitees have declined"

e "AllDeclines" (4) for "All of the invitees have declined".

The following decision table helps in evaluating the status of the whole booking. "Maybe" means that this condition only does not incontestably specify true or false result.

| Booking Status/ Confirmations | No one answered | No one accepted | Some accepted | All accepted | No one declined | Some declined | All declined |
|---|---|---|---|---|---|---|---|
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re Scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| <Phase y> | Paused | <Status x> |
| <Phase y> | Re-started | <Status x> |
| <Phase y> | Cancelled | Accounting |

Figure 7:
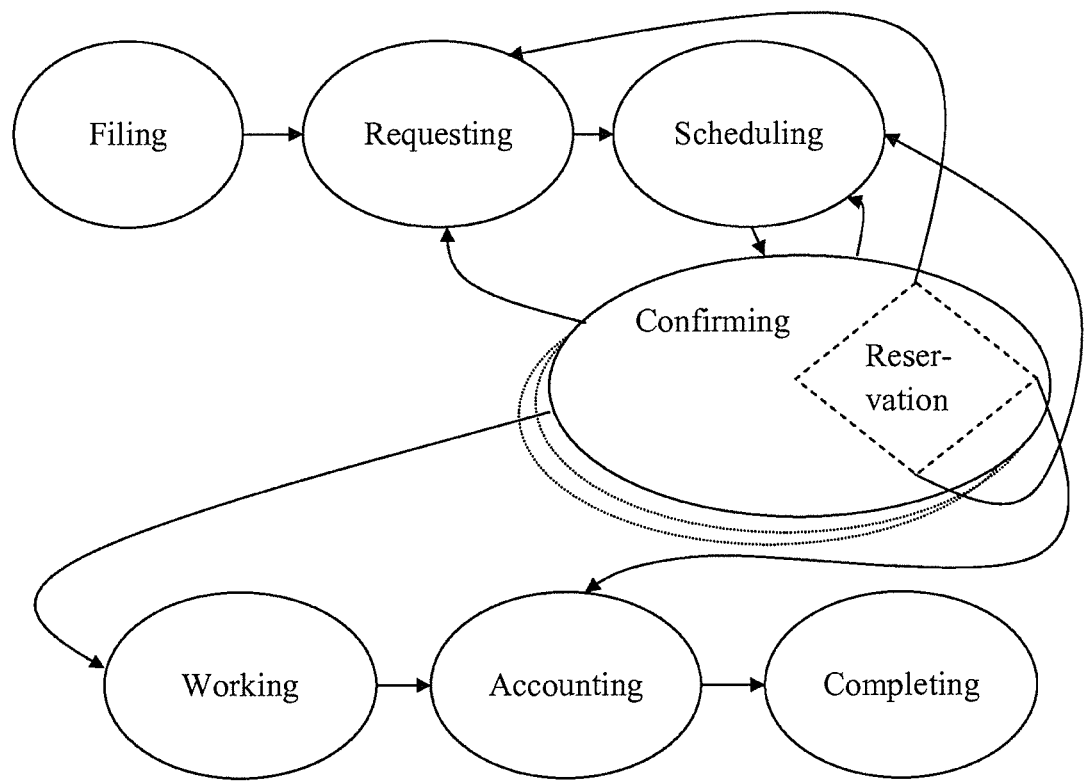
FIG. 7 shows the phases of the booking process in an embodiment of the invention.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are:

a "NoReplies" (0) for "No-one hasn't replied to the request made by the organizer"

b "NoDeclines" (1) for "Not all invitees have replied yet. The ones who have replied have accepted"

c "AllAccepts" (2) for "all invitees have confirmed"

Based on the information and decision table above the organizer/application has to make the decision of what to do with the reservation. That can be an automatic decision made by the system based on pre-set rules or made by the organizer manually.

Figure 6:
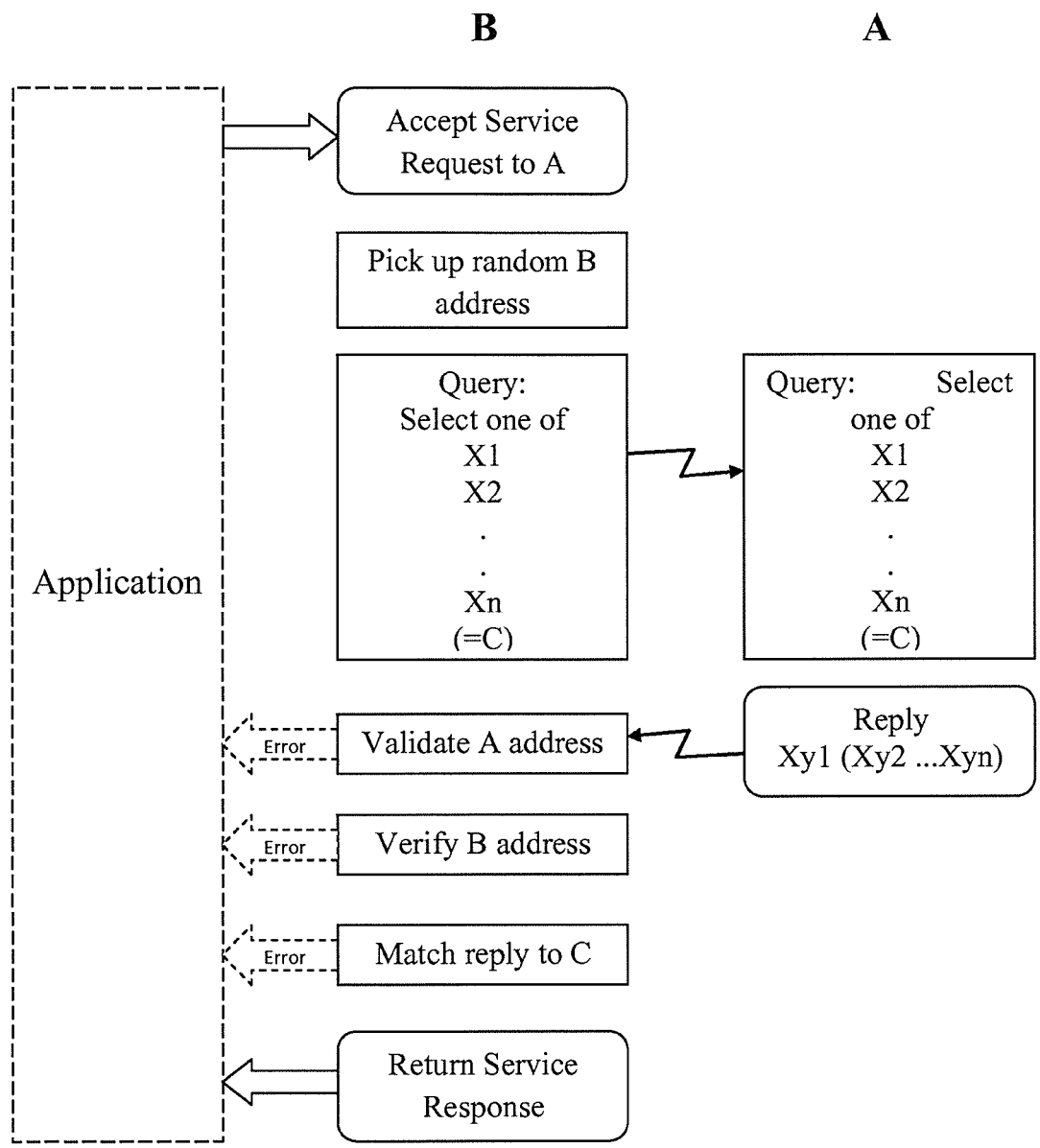
FIG. 6 shows an example of the dynamic dialog matrix applied to a query and reply according to an embodiment of the invention.

FIG. 6 shows an example of the dynamic dialog matrix applied to a query and reply according to the invention. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in his/her terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to A address whereto the mediator B has sent a query to, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

Preferably, the system with reference to FIG. 6 has a plurality B subscriber numbers (telephone numbers), wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B is sent over the telecommunication network.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

An example is for authenticating a user who is making a purchase, e.g. purchasing a software product. The user first initiates a purchase request to the company/service, e.g. directly in the software program, via an internet website or via a mobile device. The company/service then knows the user name and possible other identification information and sends a request to a credit card company to request a payment. The credit card company then sends a request to a mediator to authenticate the purchase. The mediator knows the user and the user's mobile number and sends a message, e.g. SMS or MMS, to the user's known phone number. An example of a message could be:

Dear Mr. Salonen, your credit card was used to purchase Office on 27 Mar. 2010 for 299 euros. Please reply y—to accept the payment on VISA xxxx xxxx xxxx 123 n—to reject the payment or f—to report a fraud on your credit card.

By responding to the message from the known user's mobile number with an acceptable response allows the mediator to respond to the credit card company if the user authorizes the purchase or not. Thereafter, the credit card company may authorize the payment and inform the company/service. Additionally, if the mediator sends the message from a randomly chosen reply number as discussed above, there is an added layer of authentication. Because it is possible for a fraudulent user to determine a credit card holder's mobile number and fake a message from said number, it would be extremely improbable for them to know which reply number the authentication message would originate from. The above may also be used, for example, with money transfers between a user's bank and the company/service.

An additional element of security can be achieved using semantic analysis. For example, if the user is asked to tell how many items are ordered, and the answer is "yes", then apparently the user did not know what the question was and the message was not an answer for the enquiry.

Such a system can also provide a level of security for the user. The mediator can authenticate the company/service, by any acceptable method, and only send authentication messages once the company/service has been authenticated. Then, if the user does not provide their mobile number when providing their identification information, when they get an authentication message, even from a number they do not recognize, they will know that the mediator has authenticated the company/service.

While the present example has been explained in terms of the mediator sending the message, the message could be sent by a secondary entity at the request of the mediator. For example, when the mediator receives a request to authenticate a transaction, the mediator can then provide the user's bank with the necessary transaction details and request that the bank send the necessary authentication method. Another example would be if the mediator sends a request to the bank for some of the user's identity information, e.g. mobile number, so that it can proceed with sending the actual request itself or through a tertiary service provider which handles the actual message sending.

Additionally, though the present example has been described with the transaction being the purchase of a product and authentication of the user for payment, the same system and similar method can be used for other transactions, such as the authentication of the purchased product.

The use of a Dynamic Dialogue Matrix allows for authentication and verification of products, services and transactions based on a plurality of combinations of data. Based on as little as two pieces of information from the DDM an entity can be verified. Based on more pieces of information from the DDM, a higher degree of verification can be achieved.

A DDM which is being used for verification purposes can contain, or have access to, multiple of some or all of the following: reply addresses used for sending messages, reply addresses for which messages are received, user addresses, questions, acceptable answers for questions, order of receiving answers and verification information (e.g. product keys, ID codes). A key to the DDM is that it allows verification between a company/service and a user through a mediator (and possibly another party) by matching information that each entity knows and the others should not know. Several examples are as follows:

If a user downloads a piece of software from the internet they want to know that the software is legitimate, i.e. not pirated or hacked and software developers want to make sure that users are paying to activate their programs. Therefore, prior to use the user is requested to enter a product key. The user sends a message, e.g. SMS, to a number with a product ID code. If the ID code is valid and has not been previously registered then the user receives a message with the product key. Therefore, the DDM matches the user entered product ID code with an indicator if it has been registered to verify if a product key should be issued. A similar process could work in conjunction with the payment process described above. Once the purchase of the software is authenticated as described above then an additional message can be sent to the user with the applicable product key.

A similar method and system can be used to verify the legitimacy of virtually any product, such as medicine or trademarked products. If the product has a code printed on the packaging and a known number associated with the products manufacturer or verification then a consumer can send a message to the known number with the product code to receive an indication if the code is valid and if it has been previously checked. Benefits to this system are that if pirated products do not have a code printed on the product or have an invalid code then the user will know right away. Additionally, if multiple users check the same code then the product manufacturer or verifier can check in to if the code has been reproduced by a manufacture of a pirated product. A further benefit to the system is that the product manufacturer can immediately send an inquiry back to the user if the product is determined to be pirated or suspected of piracy. An inquiry may be to ask where/when the product was purchased, what the purchase price was and/or other information which can be used to identify the entity responsible for the piracy or distribution of pirated goods.

The process may also be such that the user sends a code to the known number to receive information if the product is authentic or a pirate product. Thereafter, the manufacturer requests a further code or alike information from the user. When using two pieces of information (and possibly another sender identity than whereto the user sent the first message) to authenticate the product, the level of security is increased.

Example 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:
Please choose one of the following departure times:
6:00 a.m., answer A
7:30 a.m., answer B
8:15 a.m., answer C.
If none of these is OK, answer D.
Sender: +358440844 027
Please choose ticket class:
First class, answer A
Business class, answer B
Economy class, answer C
Cheapest available, answer D
Sender: +358440844 011
Please choose:
Window seat, answer A
Aisle seat, answer C
Sender: +358440844 034
Please select the meal:
Vegetarian, answer A
Beef answer B
Chicken, answer C
Sender: +358440844 003

The answers received from the customer to the preceding questions and several others were
'A' to question with ref. no +358 440 844 027
'D' to question with ref. no +358 440 844 011
'A' to question with ref. no +358 440 844 034
'B' to question with ref. no +358 440 844 003
'D' to question with ref. no +358 440 859 751
'A' to question with ref. no +358 440 844 277
'C' to question with ref. no +358 440 841 368

From this, the service provider can find out that the customer chose:
the first morning flight (=A),
cheapest available ticket (=D),
window seat (=A),
beef for meal (=B),
and etc.

It is important to note with the matrix the customer can answer the questions in any order, and can even fail to answer some questions. If these are relevant, the system can urge for an answer. If not, the system can proceed without this information.

Figure 8:
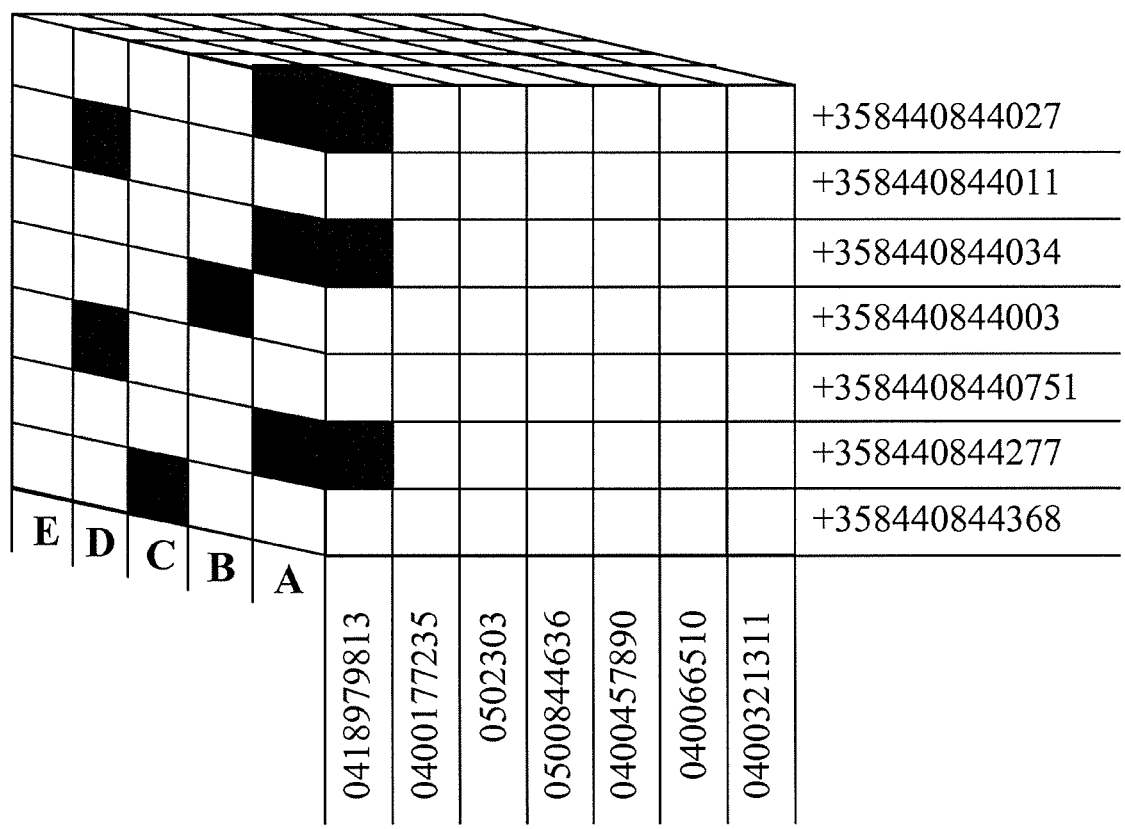
FIG. 8 shows a matrix diagram corresponding to Example 2, according to an embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

Similar series of messages can be used in conjunction with the authentication and verification as described above. For instance, if a software developer offers a 30-day trial version of their software they can require that a user enters a mobile number to activate the software. Then, based on a triggering event, a mediator can send a desired message to the user. Examples of triggering events are that the developer asks whether the installation succeeded, that the trial period is ending or has ended, that the user has not used the software for a certain period of time or the user has recently used the software. One example would be if the triggering event was that the trial period was ending the mediator could send a series of messages as follows:

You have downloaded a trial version of our software and the trial period has ended.

Please reply if you

A: did not have time to adequately test the software and would like more time,

B: would like to purchase a full version of the software or

C: would not like to continue using the software.

By responding "A" to the message the user could receive a code to enter in to the software which would give the user an additional period of time for trial. Because the software is linked to the user's mobile number from the initial activation, the mediator will know when this period runs out that it has already been extended and may not offer that option next time the trial period ends. Additionally, if someone else tried to send "A" to the number from their own mobile number the mediator would know that they had not activated any software and would know not to send any extension codes. If the user would like to purchase a full version then the user could respond with "B" and then pay and be authenticated through their mobile device as described above. If the user replies with "C" then a series of messages constituting a survey could be sent in order to help the software developer determine why the user did not want to purchase their product. Furthermore, in return for, or in response to certain answers, the mediator could send a code as a reward to the user. Again, since the mobile number of the user is tied to the software the mediator prevents other people with other mobile numbers to send a message "C" to the software developer's number in order to receive a reward. Further, other user's do not know from which number the software developer has sent the message.

An embodiment of the present invention is a method for authenticating a user having a known address comprising the steps of; sending a first message to the known address from a first reply address, receiving a reply to the first message from the known address to the first reply address, sending a second message to the known address from a second reply address, receiving a reply to the second message from the known address to the second reply address, authenticating the user based on the received replies from the known address, and wherein the first and second reply addresses are selected from a plurality of available reply addresses. Additionally, the method in accordance with the embodiment may further comprise the steps of receiving a request to authenticate a user at a known address prior to sending the first message, and sending the authentication determination to the party that requested the authentication. A method in accordance with the embodiments may also include wherein one or more additional messages are sent to the known address. A method in accordance with the embodiments may also include wherein once a reply address is selected from the plurality of available reply addresses it becomes unavailable for future selection as a reply address to the known address. A method in accordance with the embodiments may also include wherein each reply address is randomly selected from the plurality of available reply addresses. A method in accordance with the embodiments may also include wherein at least one of the messages includes an authentication question and at least one of the subsequent replies includes an answer to said authentication question. A method in accordance with the embodiments may also include wherein authenticating the user includes determining an authentication level based on the number of the plurality of available reply addresses and/or the replies to at least one of the messages. A method in accordance with the embodiments may also include wherein the authentication is additionally based on the time between sending a message and receiving the corresponding reply. A method in accordance with the embodiments may also include wherein the known address and at least a portion of the plurality of reply addresses are telephone or mobile phone numbers.

Another embodiment of the present invention is a method of software activation which comprises associating each software distribution with a unique activation code, providing a user who downloads the software with said activation code, the activation code being sent to an identifiable electronic device, retrieving information related to the identifiable electronic device and associating the activation code with the identifiable electronic device to obtain a fingerprint of said activation, storing said fingerprint including the activation code and information of the identifiable electronic device and authorizing subsequent activation of the software only to said user with said identifiable electronic device information.

Another embodiment of the present invention is a system for authenticating a user having a known address comprising; a plurality of available reply addresses a means for sending messages having one of the plurality of reply addresses a means for receiving replies to the reply addresses, and a controller configured to send a first message to the known address from a first reply address, send a second message to the known address from a second reply address and to authenticating the user based on received replies from the known address to the reply addresses.

Although the present invention has been described in considerable detail with reference to certain preferred versions thereof, other versions are possible. For example, the user's known address can be an email address or mobile telephone address as described above or it can be an online account name, such as a log-in ID. Many online accounts have 2-way and multi-way messaging features where messages are addressed to the online account name or a derivative thereof. In such instances, the present invention can be implemented with the messaging system of online account and the user's online account name. Therefore the spirit and scope of the appended claims should not be limited to the preferred versions herein.

The invention claimed is:

1. An operating method for a network server to perform the following acts for each client of a plurality of clients and at least one provider of goods and/or services, wherein the network server includes a set of dialog logics executed in the network server, the acts comprising:
    mediating, by the network server, a set of transactions between a client of the plurality of clients and the at least one provider based on the set of dialog logics,
    controlling at least one dialog using the set of dialog logics, wherein at the network server communicates over at least one communication network with a mobile terminal associated with that client using the at least one dialog,
    wherein the set of transactions involves at least one electronic payment by that client to the at least one provider,
    wherein the mediating of the set of transactions by the network server includes the network server transmitting identifier data other than financial data for that client over the at least one communication network such that the transmitted identifier data enables identification of the financial data for that client thereby facilitating processing of that at least one electronic payment for the client to the at least one provider, and
    wherein the network server facilitates the at least one electronic payment by the client to the at least one provider based on information included in the at least one dialog which includes identifier data of the financial data for the client but not the client's financial data itself.

2. The method of claim 1, wherein the mediating of the set of transactions further comprises mediating a plurality of transactions for that client, each transaction plurality of the transactions involving a respective electronic payment.

3. The method according to claim 2, wherein the method further comprises the network server using one or more of that client's profile, that client's history and that client's location to determine the transactions to be mediated between that client and the at least one provider.

4. The method of claim 1, wherein the mediating of the set of transactions further comprises the network server negotiating with a plurality of providers on behalf of that client, unprompted by that client, to identify an optimal offer for the client.

5. The method of claim 1, wherein the use of the at least one communication network to communicate with that client's mobile terminal comprises authenticating the mobile terminal using at least one dynamically variable communication parameter for communication over the at least one communication network.

6. The method of claim 5, wherein the authentication of the mobile terminal comprises verifying that that mobile terminal uses the at least one dynamically variable communication parameter for a reply message sent from the mobile terminal to the network server.

7. The method of claim 6, wherein the at least one dynamically variable communication parameter is a parameter that the mobile terminal uses in a reply message by using a reply function of that mobile terminal without explicit entry of the at least one dynamically variable communication parameter.

8. The method of claim 5, wherein the network server transmits the at least one dynamically variable communication parameter in a query message over the at least one communication network to the mobile terminal and the network server positively authenticates the mobile terminal based on whether the transmitted dynamically variable communication parameter is used in a reply message sent from the mobile terminal to the network server over the at least one communication network.

9. The method of claim 8, wherein the at least one dynamically variable communication parameter comprises a randomly selected communication address, wherein the network server positively authenticates that mobile terminal based on whether the at least one dynamically variable communication parameter is used in the reply message sent from the mobile terminal to the network server.

10. The method of claim 9, wherein the randomly selected communication address is a recipient subscriber number in a cellular mobile network.

11. The method of claim 9, wherein the randomly selected communication address is an e-mail address.

12. The method of claim 1, wherein the at least one dialog defines mutual relations of a plurality of query-reply pairs, wherein the plurality of query-reply pairs relate to a plurality of phases of a single transaction or to a plurality of related transactions.

13. The method of claim 1, wherein the set of dialog logics control a plurality of dialogs, wherein the plurality of dialogs correspond to related transactions with a plurality of providers, and wherein a reply from that mobile terminal indicating an offer has been accepted by the client automatically triggers transmission of at least one further offer of at least one further good and/or service related to the accepted offer.

14. The method of claim 1, wherein the at least one communication network includes telecommunication connections used to communicate with the mobile terminal.

15. The method of claim 14, wherein the telecommunication connections comprise cellular mobile connections.

16. The method of claim 14, wherein the telecommunication connections comprise Internet connections.

17. The method of claim 1, wherein the identifier data includes data that is transaction-specific.

18. The method of claim 1, wherein the identifier data includes data that is dynamic.

19. The method of claim 1, wherein the network server mediates synchronous and asynchronous communications with the client mobile terminal and the at least one provider.

20. The method of claim 1, wherein the network server adapts information to be included in the at least one dialog for transmission to the client's mobile terminal and the at least one provider.

21. A network server comprising a set of network interfaces for connecting with at least one provider of goods and/or services and a plurality of clients,
    wherein each client is associated with a mobile terminal,
    wherein the network server includes a set of dialog logics executed in the network server,
    wherein the network server mediates a set of transactions between a client of the plurality of clients and the at least one provider based on the set of dialog logics,
    wherein the network server controls at least one dialog using the set of dialog logics to communicate with a mobile terminal associated with the client, wherein the set of transactions involves at least one electronic payment by the client to the at least one provider, wherein, when mediating the set of transactions, the network server transmits identifier data other than financial data for that client over the at least one communication network such that the transmitted identifier data enables identification of the financial data for the client thereby facilitating processing of the at least one electronic payment for the client to the at least one provider, and wherein the network server facilitates the at least one electronic payment by the client to the at least one provider based on information included in the at least one dialog which includes identifier data of the financial data for the client but not the client's financial data itself.

22. The network server of claim 21, wherein the network server mediates synchronous and asynchronous communications with the client mobile terminal and the at least one provider.

23. The network server of claim 21, wherein the network server adapts information to be included in the at least one dialog for transmission to the client's mobile terminal and the at least one provider.

24. The network server of claim 21, wherein the mediating of the set of transactions further comprises mediating a plurality of transactions for that client, each transaction plurality of the transactions involving a respective electronic payment.

25. The method according to claim 24, wherein the method further comprises the network server using one or more of that client's profile, that client's history and that client's location to determine the transactions to be mediated between that client and the at least one provider.

26. The network server of claim 21, wherein the mediating of the set of transactions further comprises the network server negotiating with a plurality of providers on behalf of that client, unprompted by that client, to identify an optimal offer for the client.

27. The network server of claim 21, wherein the use of the at least one communication network to communicate with that client's mobile terminal comprises authenticating the mobile terminal using at least one dynamically variable communication parameter for communication over the at least one communication network.

28. The network server of claim 27, wherein the authentication of the mobile terminal comprises verifying that that mobile terminal uses the at least one dynamically variable communication parameter for a reply message sent from the mobile terminal to the network server.

29. The network server of claim 28, wherein the at least one dynamically variable communication parameter is a parameter that the mobile terminal uses in a reply message by using a reply function of that mobile terminal without explicit entry of the at least one dynamically variable communication parameter.

30. The network server of claim 27, wherein the network server transmits the at least one dynamically variable communication parameter in a query message over the at least one communication network to the mobile terminal and the network server positively authenticates the mobile terminal based on whether the transmitted dynamically variable communication parameter is used in a reply message sent from the mobile terminal to the network server over the at least one communication network.

31. The network server of claim 30, wherein the at least one dynamically variable communication parameter comprises a randomly selected communication address, wherein the network server positively authenticates that mobile terminal based on whether the at least one dynamically variable communication parameter is used in the reply message sent from the mobile terminal to the network server.

32. The network server of claim 31, wherein the randomly selected communication address is a recipient subscriber number in a cellular mobile network.

33. The network server of claim 31, wherein the randomly selected communication address is an e-mail address.

34. The network server of claim 21, wherein the at least one dialog defines mutual relations of a plurality of query-reply pairs, wherein the plurality of query-reply pairs relate to a plurality of phases of a single transaction or to a plurality of related transactions.

35. The network server of claim 21, wherein the set of dialog logics control a plurality of dialogs, wherein the plurality of dialogs correspond to related transactions with a plurality of providers, and wherein a reply from that mobile terminal indicating an offer has been accepted by the client automatically triggers transmission of at least one further offer of at least one further good and/or service related to the accepted offer.

36. The network server of claim 21, wherein the at least one communication network includes telecommunication connections used to communicate with the mobile terminal.

37. The network server of claim 36, wherein the telecommunication connections comprise cellular mobile connections.

38. The network server of claim 36, wherein the telecommunication connections comprise Internet connections.

39. The network server of claim 21, wherein the identifier data includes data that is transaction-specific.

40. The network server of claim 21, wherein the identifier data includes data that is dynamic.

* * * * *